J. B. CRAWFORD & J. R. MILLIKEN.
TIRE.
APPLICATION FILED APR. 7, 1910.
990,848.
Patented May 2, 1911.
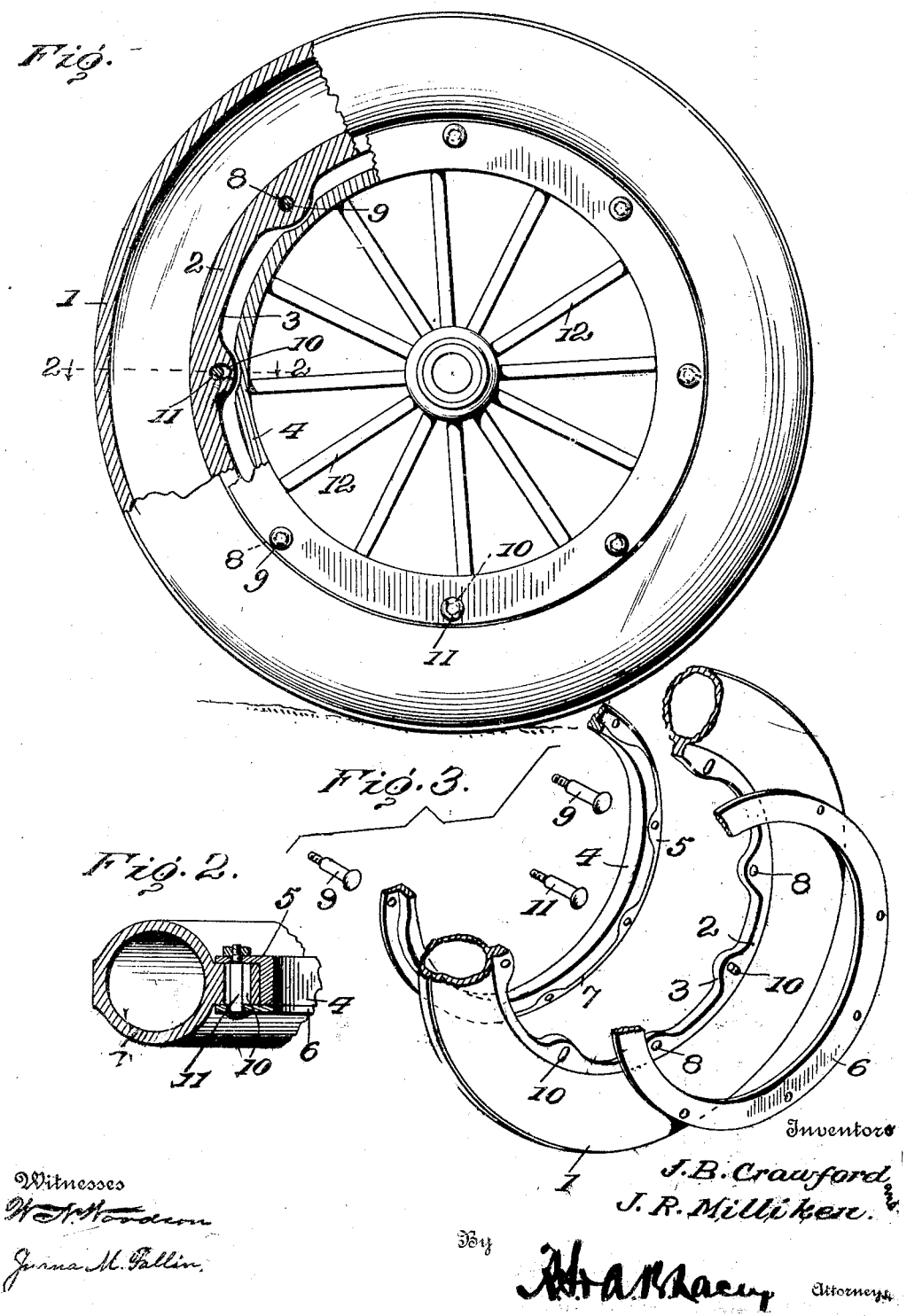

UNITED STATES PATENT OFFICE.

JAMES B. CRAWFORD AND JAMES R. MILLIKEN, OF SIOUX CITY, IOWA.

TIRE.

990,848.  Specification of Letters Patent.  Patented May 2, 1911.

Application filed April 7, 1910. Serial No. 554,058.

*To all whom it may concern:*

Be it known that we, JAMES B. CRAWFORD and JAMES R. MILLIKEN, citizens of the United States, residing at Sioux City, in the county of Woodbury and State of Iowa, have invented certain new and useful Improvements in Tires, of which the following is a specification.

This invention comprehends certain new and useful improvements in wheels and tires for automobiles or other vehicles, and the invention has for its primary object, a simple, durable and efficient construction of vehicle wheel in which the felly and tire are constructed entirely of metal (although it is to be understood that the metallic tire may be provided with a resilient tread surface) with no intervening resilient elements such as rubber blocks, tubes or metallic or other springs, the invention aiming to provide a vehicle wheel which will be strong and durable and which will be so constructed and arranged that any blow, shock, or jar occasioned by the tread of the tire coming in contact suddenly with any hard foreign substance cannot be communicated to the hub of the wheel nor felt by the occupants of the vehicle. And the invention has for a further object, the provision of means whereby through proper adjustment and construction, there is produced a metallic tire and wheel which avoids the communication of any shock, or jar, strain or blow imposed upon the tread surface of the tire, to the hub of the wheel and through the hub to the body of the car and other vehicle.

With these and other objects in view, as will more fully appear as the description proceeds, the invention consists in certain constructions, arrangements and combinations of the parts that we shall hereinafter fully describe and claim.

For a full understanding of the invention, reference is to be had to the following description and accompanying drawings in which:

Figure 1 is a side elevation of a tire and wheel constructed in accordance with our invention, the parts being shown in section; Fig. 2 is a transverse sectional view on the line 2—2 of Fig. 1; and, Fig. 3 is a perspective view of some of the parts detached and broken away.

Corresponding and like parts are referred to in the following description and indicated in all the views of the accompanying drawings by the same reference characters.

The tire of our improved vehicle wheel may be constructed of cast iron or other metal of sufficient thickness and strength to withstand hard usage and wear and may be constructed in one piece if made of cast iron or the like, or, if made of rolled steel may be constructed in two or more pieces or parts, and the two parts brazed together, at the point constituting the tread of the tire, the tire being preferably of the general form shown in Fig. 3 with a tubular body portion 1, and an inwardly extending annular flange 2 which is preferably formed with an undulating inner edge 3. If desired, the outer edge or tread surface of the tubular body portion 1 of the tire may be provided with a cushion tread surface of rubber or the like secured thereto in any desired way.

The felly of the wheel is preferably composed of two parts, one of which embodies a circular member 4 preferably formed integrally with an outstanding annular flange 5, the latter being adapted to bear against one side face of the flange 2 of the tire, the other part is in the nature of a ring as indicated at 6 adapted to be secured to the relatively free side edge of the circular member 4 in any desired way, or by any desired means and adapted to lie against the opposite side face of the flange 2; the felly when completed being in the nature of a two-part channeled rim. Preferably the circular member 4 of the felly, which constitutes the bottom of the channeled rim is somewhat undulating as indicated at 7, the undulations corresponding in extent and number substantially with the undulations of the inner edge 3 of the flange 2.

The flange 2 of the tire is formed with two sets of openings extending transversely therethrough, there being any desired number of openings in each set and all of the openings being preferably arranged equidistant from each other. The openings of each set are preferably diametrically opposed to each other, there being eight openings in the present instance, although it is to be understood that any desired number of openings may be used. The openings of one set designated 8 are round holes, and are used for inserting relatively small bolts 9 for fastening the flange 2 to the flange 5 and ring 6 of the felly of the wheel.

These holes 8 are slightly larger than the bolts 9 so that there is no bearing of the tire on these bolts. The other openings designated 10 are radially elongated as clearly illustrated in the drawing and are used for receiving large bolts 11, these last named bolts being the bolts which carry the weight of the vehicle. The bolts 11 are so placed and constructed that only two of them are engaged at one and the same time when the wheel is standing still, but when the wheel is in motion, then all of the four carrying bolts 11 are engaged at one and the same time. The bolts 11 are of a diameter substantially equal to the width of the radially elongated openings or slots 10, so that they fit closely in the narrow way of the openings but they do not fit closely in the elongated way of the openings 10, spaces being thereby provided which will permit of the tire springing or giving, thus producing elasticity or resiliency.

Preferably all of the bolts are made of cold rolled steel hammered, with one end turned down and threaded, leaving a shoulder which bears against the inside of the felly and prevents the felly rim binding upon the tire and making a complete lock nut. Of course the bolts are made to fit perfectly the holes in the felly.

Connecting the felly with the hub are any desired number of spokes 12, the same being preferably so arranged that none of the connecting points of the spokes with the felly are directly opposite to any of the carrying bolts 11, nor directly opposite the bolts 9, thus avoiding any direct or positive communication with the tire and the hub of the wheel, and through the hub to the body of the car.

Having thus described the invention, what is claimed as new is:

1. A tire of the character described, consisting of a metallic body portion provided with an inwardly extending annular flange, in combination with a felly embracing the flange, the flange being formed with radially extending transversely opening slots, bolts extending through the sides of the felly and of substantially the same width as said slots, but capable of moving radially therein, the flange being also formed with round openings extending transversely therethrough and other bolts of slightly smaller diameter than said round openings extending through said openings and secured to the sides of the felly.

2. The herein described tire, consisting of a metallic body portion formed with an inwardly extending annular flange, the flange being formed with transverse openings extending therethrough, a channeled rim, the side members of which embrace the flange, the bottom of the rim being undulated and the inner edge of the flange being correspondingly undulated, and bolts extending through the side members of the rim and through the openings in the flange and being of slightly smaller diameter than said openings.

3. The herein described tire, consisting of a metallic body portion, formed with an inwardly extending annular flange, said flange being formed with a plurality of openings extending transversely therethrough in combination with a rim which embraces the flange, bolts extending through the side members of the rim and mounted in said openings and of less diameter than the openings, the said openings being diametrically opposite to each other, the flange being formed with another set of openings, said last named openings being radially elongated and bolts mounted in said last named openings and secured to the side members of the rim, the last named bolts having a limited radial movement in said last named openings.

4. The herein described tire, consisting of a metallic body portion formed with an inwardly extending annular flange, said flange being formed with a plurality of openings extending transversely therethrough, in combination with a rim which embraces the flange, bolts extending through the side members of the rim and mounted in said openings and of less diameter than the openings, the said openings being diametrically opposite to each other, the flange being formed with another set of openings, said last named openings being radially elongated and bolts mounted in said last named openings and secured to the side members of the rim, the last named bolts having a limited radial movement in said openings all of said bolts being reduced at their threaded extremities to bear against the inner side of the rim whereby to prevent the rim from binding inwardly upon the flange.

In testimony whereof, we affix our signatures in presence of two witnesses.

JAMES B. CRAWFORD. [L. S.]
JAMES R. MILLIKEN. [L. S.]

Witnesses:
H. B. CARTER,
JNO. R. CARTER.